US009413844B2

(12) United States Patent
Godon et al.

(10) Patent No.: US 9,413,844 B2
(45) Date of Patent: Aug. 9, 2016

(54) SYSTEM FOR PROVIDING INFORMATION TO USERS SHARING A NOMADIC EXPERIENCE

(75) Inventors: Marc Bruno Frieda Godon, Londerzeel (BE); Zhe Lou, Antwerp (BE); Lieven Leopold Albertine Trappeniers, Herentals (BE); Michael Frederik Francois Albert Brackx, Ghent (BE); Sigurd Van Broeck, Zoersel (BE); Johan Georges Prosper Criel, Ghent (BE)

(73) Assignee: Alcatel Lucent, Boulogne-Billancourt (FR)

( * ) Notice: Subject to any disclaimer, the term of this patent is extended or adjusted under 35 U.S.C. 154(b) by 1915 days.

(21) Appl. No.: 12/137,730

(22) Filed: Jun. 12, 2008

(65) Prior Publication Data
US 2008/0320084 A1 Dec. 25, 2008

(30) Foreign Application Priority Data
Jun. 22, 2007 (EP) ................................... 07290776

(51) Int. Cl.
G06F 15/16 (2006.01)
H04L 29/08 (2006.01)
H04W 4/02 (2009.01)
(52) U.S. Cl.
CPC .............. *H04L 67/306* (2013.01); *H04L 67/18* (2013.01); *H04W 4/02* (2013.01)
(58) Field of Classification Search
CPC ........ H04L 67/306; H04L 67/18; H04W 4/02

USPC .................... 709/205; 711/211, 213; 455/519
See application file for complete search history.

(56) References Cited

U.S. PATENT DOCUMENTS

| 5,767,795 | A | * | 6/1998 | Schaphorst | .................... | 340/988 |
| 6,012,984 | A | * | 1/2000 | Roseman | ......................... | 463/42 |
| 6,085,148 | A | * | 7/2000 | Jamison et al. | ................ | 701/211 |
| 6,266,614 | B1 | * | 7/2001 | Alumbaugh | ................... | 701/211 |
| 6,278,938 | B1 | * | 8/2001 | Alumbaugh | ................... | 701/208 |
| 6,381,535 | B1 | * | 4/2002 | Durocher et al. | ............. | 701/202 |
| 6,526,351 | B2 | * | 2/2003 | Whitham | ....................... | 701/211 |
| 6,691,026 | B2 | * | 2/2004 | Odinak et al. | ................. | 701/202 |
| 6,839,680 | B1 | | 1/2005 | Liu et al. | | |
| 6,975,873 | B1 | * | 12/2005 | Banks et al. | ............... | 455/456.5 |

(Continued)

FOREIGN PATENT DOCUMENTS

CN 1794771 A 6/2006

OTHER PUBLICATIONS

Translation of CN 1794771.
(Continued)

*Primary Examiner* — Douglas Blair
(74) *Attorney, Agent, or Firm* — Fay Sharpe, LLP

(57) ABSTRACT

The present invention relates to a system for providing information to one or more users sharing a nomadic experience. The system comprises client terminals ($107_1$-$107_5$) and a server platform (101). The server platform (101) consists of one or more first servers (103) for maintaining groups of users and one or more second servers (102) for interactively sharing information within a group of users. The system further comprises communication channels providing connectivity between client terminals ($107_1$-$107_5$) and the server platform (101).

29 Claims, 5 Drawing Sheets

(56) References Cited

U.S. PATENT DOCUMENTS

| | | | |
|---|---|---|---|
| 7,071,842 B1* | 7/2006 | Brady, Jr. | 340/988 |
| 7,120,539 B2* | 10/2006 | Krull et al. | 701/210 |
| 7,155,338 B2* | 12/2006 | Kauvo et al. | 701/420 |
| 7,359,724 B2* | 4/2008 | Torvinen | 455/518 |
| 7,589,628 B1* | 9/2009 | Brady, Jr. | 340/539.11 |
| 7,652,594 B2* | 1/2010 | Lamont et al. | 340/988 |
| 7,751,971 B2* | 7/2010 | Chang et al. | 701/426 |
| 7,813,741 B2* | 10/2010 | Hendrey et al. | 455/456.1 |
| 7,853,272 B2* | 12/2010 | Tipnis et al. | 455/456.3 |
| 7,908,320 B2* | 3/2011 | Ludwig et al. | 709/204 |
| 8,068,866 B2* | 11/2011 | Isobe et al. | 455/519 |
| 8,078,189 B2* | 12/2011 | Chang et al. | 455/456.1 |
| 8,138,907 B2* | 3/2012 | Barbeau et al. | 340/457 |
| 2002/0019696 A1* | 2/2002 | Kruse | 701/207 |
| 2002/0070865 A1* | 6/2002 | Lancos et al. | 340/573.1 |
| 2002/0075151 A1* | 6/2002 | Lancos et al. | 340/572.1 |
| 2002/0077872 A1* | 6/2002 | Lancos et al. | 705/5 |
| 2002/0077883 A1* | 6/2002 | Lancos et al. | 705/10 |
| 2002/0082859 A1* | 6/2002 | Lancos et al. | 705/1 |
| 2003/0009281 A1* | 1/2003 | Whitham | 701/211 |
| 2004/0078813 A1* | 4/2004 | Kobuya et al. | 725/46 |
| 2004/0203907 A1* | 10/2004 | Hiller et al. | 455/456.1 |
| 2005/0096843 A1* | 5/2005 | Del Monte | 701/211 |
| 2005/0119903 A1* | 6/2005 | Lee | 705/1 |
| 2005/0192025 A1* | 9/2005 | Kaplan | 455/456.1 |
| 2005/0227709 A1* | 10/2005 | Chang et al. | 455/456.1 |
| 2005/0278371 A1* | 12/2005 | Funk et al. | 707/102 |
| 2006/0184313 A1* | 8/2006 | Butler, Jr. | 701/200 |
| 2007/0208749 A1* | 9/2007 | Price et al. | 707/10 |
| 2008/0177793 A1* | 7/2008 | Epstein et al. | 707/104.1 |
| 2009/0119008 A1* | 5/2009 | Kobuya et al. | 701/208 |
| 2010/0191462 A1* | 7/2010 | Kobuya et al. | 701/208 |
| 2011/0065455 A1* | 3/2011 | Tipnis et al. | 455/456.3 |

OTHER PUBLICATIONS

Falk.Marcoplo.Interactive, http://www.fm-i.de/en/24_1815.htm, printout on Jan. 28, 2016, from the Internet Archive (http://web.archive.org) record captured on Oct. 10, 2007.

* cited by examiner

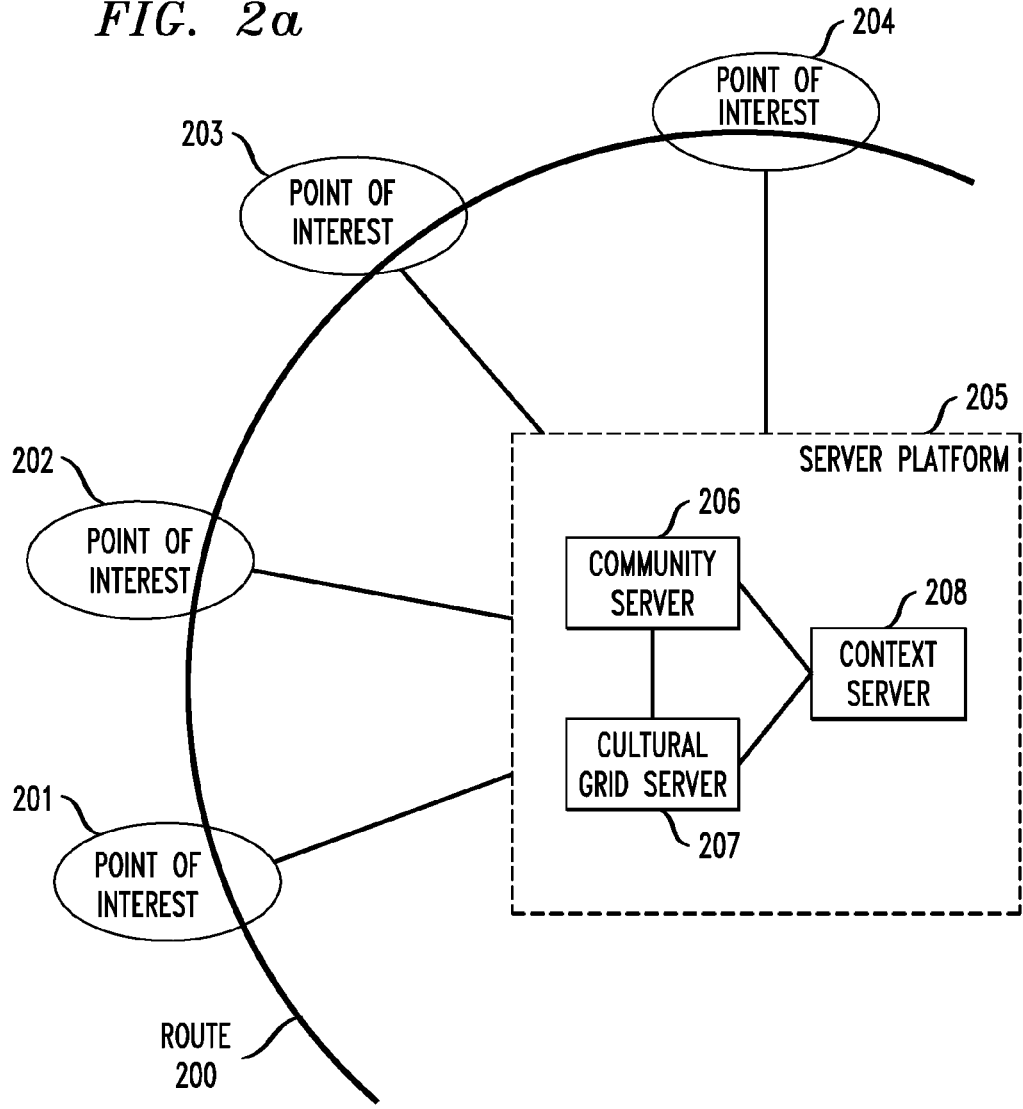
FIG. 2a
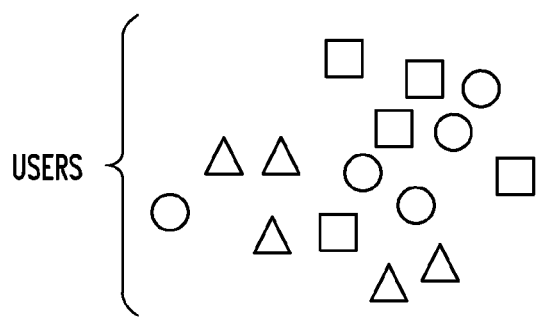
USERS

SYSTEM FOR PROVIDING INFORMATION TO USERS SHARING A NOMADIC EXPERIENCE

FIELD OF THE INVENTION

The present invention generally relates to interactively visiting points of interests and more in particular to an interactive nomadic user experience.

BACKGROUND OF THE INVENTION

Guided tours are often used to offer a visitor a complete view on an exposition, city, country, company, park, etc. The tour ensures that a visitor is sent to all the important points of interest and that the visitor receives an explanation at each point. The explanation can be a wide range of information. For instance, history of a place, how a machine works, how a city evolved, etc. In general, it tells visitors everything they may want to know or should know about the point of interest which they are currently visiting. An obvious way of providing visitors with a guided tour, is with human guides who move around with the visitors and give an oral explanation during the tour. This way, the visitors get an experience wherein personal experiences of the guide can be added to the general information that is provided by each guide. However, personal experiences from various guides are not always shared with all the visitors.

Alternatively to human guides, terminals which can be carried by a visitor can be used to give a guided tour. These terminals can for instance contain a screen whereon visual information is shown, or the terminals can also contain speakers or a headphone plug for audio based information. The terminal may also be designed to offer a combination of audio and video to the user during the tour. Such terminals can show a predefined route to the user, for instance a chronological order of the paintings and statues in a museum or a chronological order of when particular buildings were constructed, or any other ordering of the points of interest in a particular way. Such terminal can contain a Global Positioning System (GPS) receiver which can be used to trigger information related to the current location of the visitor. This enables a visitor to walk to various points of interest in the order he wants and receive related information when the visitor arrives at a given point. One example of a guided tour with a terminal carried by a user is offered by the tourist service of the province of Limburg in Belgium. They provide a terminal to cyclists which offers information on various routes in the province related to a particular subject.

However, several problems exist with these existing methods and tools for guiding visitors. A problem of the first prior art solution is that human guides are generally only available for groups that want to take a tour. This means that everyone in the group has to follow the guide which implies that there is no free choice of the route. Thus, a visitor cannot skip a particular point of interest along the route or take an alternative route to visit all the points of interest.

A problem with the second prior art solution is that the existing terminals are limited in the information they can provide. They are set-up with particular pieces of information such as audio and video fragments or texts which relate to the points of interest. Once the information is on the terminal, it cannot change during the visit without a reconfiguration of the device. This means that the information cannot be adapted to temporary exhibitions or special events that may occur from time to time. These terminals do enable the general public to change their route, for instance if the terminals are GPS based or offer a selection of all the available points of interest to the visitor. However, in doing so, the experience of participating in a group is greatly reduced if not inexistent. If everyone visits the points of interest in the order they choose, there is less or no contact amongst the visitors. It is impossible to exchange information between visitors unless they stick together during the tour.

An additional drawback of such devices is that they are only able to deliver rather static information to a user and to determine the location of the user. However, context information such as the time of day, weather conditions, the number of visitors at an event or exhibition, etc. are not taken into account. As a result, the visitor can end up in a very crowded place while other parts of a tour are empty, or a visitor can be sent into the rain while a part of the indoor exhibition could be visited first.

It is an object of the present invention to provide a system for of experiencing a tour or nomadic event in an interactive way, i.e. in a way wherein information is provided to the users without losing the group experience and without requiring every user of the group to simultaneously follow the exact same route. It is a further object of the invention to deliver context specific information to users sharing a nomadic experience.

SUMMARY OF THE INVENTION

The above described objectives of the present invention and a solution for the above described disadvantages of the prior art according to the present invention are achieved by a system for providing information to one or more users sharing a nomadic experience, the system comprising one or more client terminals, characterized in that the system further comprises:

a server platform comprising at least one first server for maintaining groups of users and at least one second server for interactively sharing information within a group of users; and one or more communication channels for connectivity between the client terminals and the server platform.

Indeed, by having a server platform with a first server, the server platform itself is made aware of groups within such groups, the second server then enables interaction thus creating a group experience during the nomadic event. The first server maintains all the users and the groups whereto each user belongs. For instance, the first server can place users in different groups based on their origin such as the same company, school, family, time of applying, etc. This way, each user can have a nomadic experience while visiting various points of interest where the experience are adapted to the wishes and interests of the group where the user belongs to but where each user is free to move away from the group.

Communication channels between the client terminals and the server platform enable to keep the user and group information up-to-date, e.g. when a user accesses a client terminal. The terminal can retrieve the current group for a particular user or information related to the user or group. The second server is able to deliver general information to the users of a group and is able to handle group-specific information. The second server can broadcast a message from one user to other users in the same group and deliver all the responses as a single answer to the original user. The second server can further provide additional information in relation to a point of interest, based on the group and the preferences of the group. The second server may also be aware of the route set out for a particular group and provide instructions to the next point of interest when a user of a group visits a client terminal.

The client terminal can be a handheld device which is carried by a user, with a video and/or audio interface, for instance a tablet PC with touch-screen and speakers, a Personal Digital Assistant (PDA) with software running thereon supporting guided tours and having a screen and headphones socket, etc. Alternatively, the visitor can carry a small identification item which is used at fixed client terminals that are located at each point of interest. Such fixed terminals are connected to the server platform by a communication channel and can be provided with an audio and/or video interface and a reader for an identification item. One example is a wristband with a Radio Frequency Identification (RFID) tag therein and a touch-screen located at various paintings in a museum with an RFID reader connected to the screen. A visitor can be identified by the RFID tag in the identification item, which can be used by the client terminal to determine the group whereto the user belongs. Thanks to the current invention, the terminal can then show information to the user and incorporate group information into the information.

An optional feature of the system according to the present invention is that the server platform further may comprise at least one third server for selecting and/or filtering information based on a context of a user.

The context of users provides additional information to the server platform about the users, and consequentially about a group as a whole. The context can be information such as the current client terminal where a user is in case of fixed terminals, information transmitted to the third server by a client terminal, information retrieved from external sources (e.g. weather information from a forecast service), etc. Such information can then be used by the third server to initiate actions from other nodes in the server platform, for instance the second server can be triggered to send particular information to a user, the next point of interest can be changed to a different point, etc. or the third server can initiate actions from the first server, for instance removing a user from a group when the user leaves the event.

The third server can also filter information that is sent to some or all users in a group. The third server may be aware of points of interest where a particular user has been before. As a result, this user can be an ideal candidate to answer questions about that particular point of interest and thus the third server can filter those questions out for users who have not been there before.

Further optionally, a second server in the system according to the present invention may comprise one or more of the following:
  means for receiving a trigger from a first server and/or a third server;
  means for gathering information in response to a trigger;
  means for involving other users of a group in gathering information;
  means for storing or retrieving the route followed by the users of said group;
  means for communicating with a first server for checking consistency of a group;
  means for communicating with a third server for checking consistency of the context; and
  means for responding to a trigger.

The second server is generally able to interactively share information within a group of users. To achieve this, the second server may be adapted to receive triggers from various sources. A trigger is a message or signal which informs the second server that information is requested or should be sent to a user or group. These triggers can originate from the users by using a client terminal or can originate from other nodes in the server platform. For instance, the first server can trigger the second server when a group composition changes or the third server can trigger the second server when particular changes occur to the context of one or more users.

If the second server is triggered, it needs to locate the information that is requested or the information that is to be delivered based on a particular trigger. The second server can have an internal database with information which can be queried in response to a trigger, the second server may be able to access the Internet to retrieve information, the second server may be able to forward requests to other users in the same group or initiate a message to members of the same group relating to the information. However, it can be important for the second server to verify the consistency of a group before forwarding messages or requesting input from other users. Therefore, the second server may be able to communicate with the first server. This enables the second server to request group membership information for a particular user or to verify which users are actually part of a group. Similarly the second server may be able to communicate with a third server to verify the context information for a user or group. For instance, if the second server has a local storage of context information, it may check if the local storage is not out of date, or, the second server may need to verify the context of a user before transmitting information to a user or group. Additionally, the second server may be able to consider the route followed by a user. Such route can be a logical description of the overall experience, such as how the nomadic experience leads to achieving particular goals. Such goals can for instance be learning more about a particular subject, understanding the evolution of a city or artist, etc. The route may be predefined by the person organizing a nomadic experience, a museum curator, the tourist service of a town or may be defined/altered by one or more members of the group during the visit. This kind of information can be incorporated in the interaction between users, for instance when requesting group interaction or when selecting the information that is retrieved for a user to ensure that the nomadic experience has the desired effects.

In addition, the second server may be adapted to generate a response to a trigger, for instance a message indicating that a trigger was received and will be processed, a message to a user with information, a signal to the first server or third server to update their contents, etc.

Still optionally, a first server in the system according to the present invention may comprise one or more of the following:
  means for managing a user-group association;
  means for maintaining user preferences;
  means for maintaining user availability in a group; and
  means for sending a trigger to a second server.

The first server manages the association of users and groups and manages information related to the preferences of users or possibly even groups. The first server may be able to automatically associate users with a particular group, for instance based on an identification system which can determine the origin of a user such as the company or school to which a particular user belongs. The first server may also provide an interface to an administrator where he can enter new users and associate these new users with a group. In addition, the management of users and groups also allows the first server to retrieve associations and provide the associations to other nodes in the server platform or even to client terminals with or without passing through other nodes in the server platform. The first server can also manage user preferences, for instance preferences related to the favourite subjects of a user (e.g. artists, fields of technology, sports, locations in a town, etc.), preferences related to the preferred context of a user such as weather conditions, busy or calm places, etc. These preferences can be defined by a user at a client terminal, by an administrator using an interface, based on market research, etc. Furthermore, a user's availability in a group may change during the visit. For instance, a person may not wish to be disturbed while experiencing a particular point of a visit, Therefore the first server may be able to track these changes and provide the availability information to other users or systems. The first server may be able to automatically set a user's availability when certain tasks are performed such as an information request or moving away from a point of interest. The user may also be able to manually indicate his availability through a terminal.

If the first server is able to store and retrieve all this information, it is also able to provide the information to other nodes of the server platforms and client terminals. It may rely on client terminals or the nodes to request the information, but by sending triggers to the second server based on changing group conditions it can ensure up to date information in the second server. As a result, the experience of a group can be enhanced by personalizing the experience based on this information. In addition, the second server has a range of information on which it can base its selection and filtering of information that is delivered to a user or group.

Also optionally, the third server in the system according to the present invention may comprise one or more of the following:
 means for dynamically and continuously monitoring the context of the users; and
 means for sending a trigger to a second server.

The third server may be used by other nodes in the server platform to determine appropriate actions in relation to the context of a particular user. Therefore, the third server may benefit from an ability to have a continuous overview of the users, groups and their context. This can be achieved by requesting frequent context updates from client terminals, other nodes in the server platform or sources external to the server platform such as the Internet or a corporate intranet. Alternatively, the third server may automatically receive such updates from client terminals. The third server may be adapted to monitor changes in the context of a user and based on a set of rules determine which actions are required for which changes. For instance, the third server may have a rule that guides all users to an indoor location when weather conditions turn bad such as precipitation or a rule that diverts groups to other points of interest if a particular point is crowded. To enable reactions based on the changes in context of a user, the third server may be adapted to send triggers to a first server or a second server. This way, those servers are aware of the changes and can take appropriate actions.

Optionally, the system according to the present invention can be adapted so that the server platform further comprises means for storing elements of information and means for providing these elements to one or more of the groups.

The second server may have access to a range of information sources such as an internal database storing information related to a tour or various points of interests, the Internet, corporate intranets, a museum intranet, etc. As a result, the second server can provide such information to the users of the system. However, the system is interactive which implies that a lot of valuable information which is not stored in the second server might be exchanged within a group. By adapting the second server to store such information, or elements thereof, the knowledge of the system can be extended for future use. In addition, the second server may also be able to do a similar thing for information retrieved from those external sources such as the Internet or intranets. It can lookup information upon user request and store elements of the answers for future reference.

The second server may be able to determine valuable information automatically, or it may forward questions and answers to an administrator who can add the information to the second server for future reference. There may also be an interface for users to enter suggestions or information or an option to submit the question of a user and the related response for storage. Such submission may then be reviewed by an administrator or added automatically.

An optional aspect of the current invention is that the nomadic experience may comprise one or more of the following:
 a city visit;
 an event visit;
 a museum visit; and
 a company visit.

The nomadic experience involves multiple users visiting multiple points of interest which generally are linked together by a theme or subject. For instance, a city tour takes users to the most interesting places in the city, a museum tour takes the users to the important artworks in the museum and a company visit can show the steps of a production process, the products of the company, the buildings of the company, etc. These visits generally require the users to move from one point to another and may cover large areas.

Another optional aspect of the current is that the context of a user may comprise information related to one or more of the following:
 weather conditions at the location of a user;
 a route followed by a user;
 a number of users; and
 theme of a nomadic experience.

The weather conditions at the location of a user can be used to adapt a route of a group according to these weather conditions. For instance, a tour which involves both indoor and outdoor locations can be altered in such a way that users are inside when it is raining and outside when the sun is shining. Weather conditions can also be used in selecting information, for instance when visiting a nature reserve, conditions such as the season can be used to give information related to the current season or how particular weather effects influence the nature.

The route followed by a user can be information indicating the points of interest which a user has visited and points of interest which are not yet visited. Such information can be used to direct questions about a point of interest to users who have or have not yet visited that point. In addition, such information can be used to determine if multiple large groups will run into each other if they continue their route, or in combination with a number of users at a location the information can be used to determine if a large crowd will form at a particular place. For instance in places with small rooms or corridors, it can be disadvantageous to have such large crowds, e.g. due security concerns.

The theme of the nomadic experience can be a general subject underlying each point of interest such as buildings in a town, artwork of a particular artist, important places in the life of a famous person, a popular television series, a zoo, a nature reserve etc. Such subject can be used to request additional information from external sources or as graphical theme for the presentation of information to users.

BRIEF DESCRIPTION OF THE DRAWINGS

FIG. 2a to 2d illustrate an overview of a location with four points of interest with client terminals and a server platform according to an embodiment of the present invention.

DETAILED DESCRIPTION OF EMBODIMENT(S)

Figure 1:
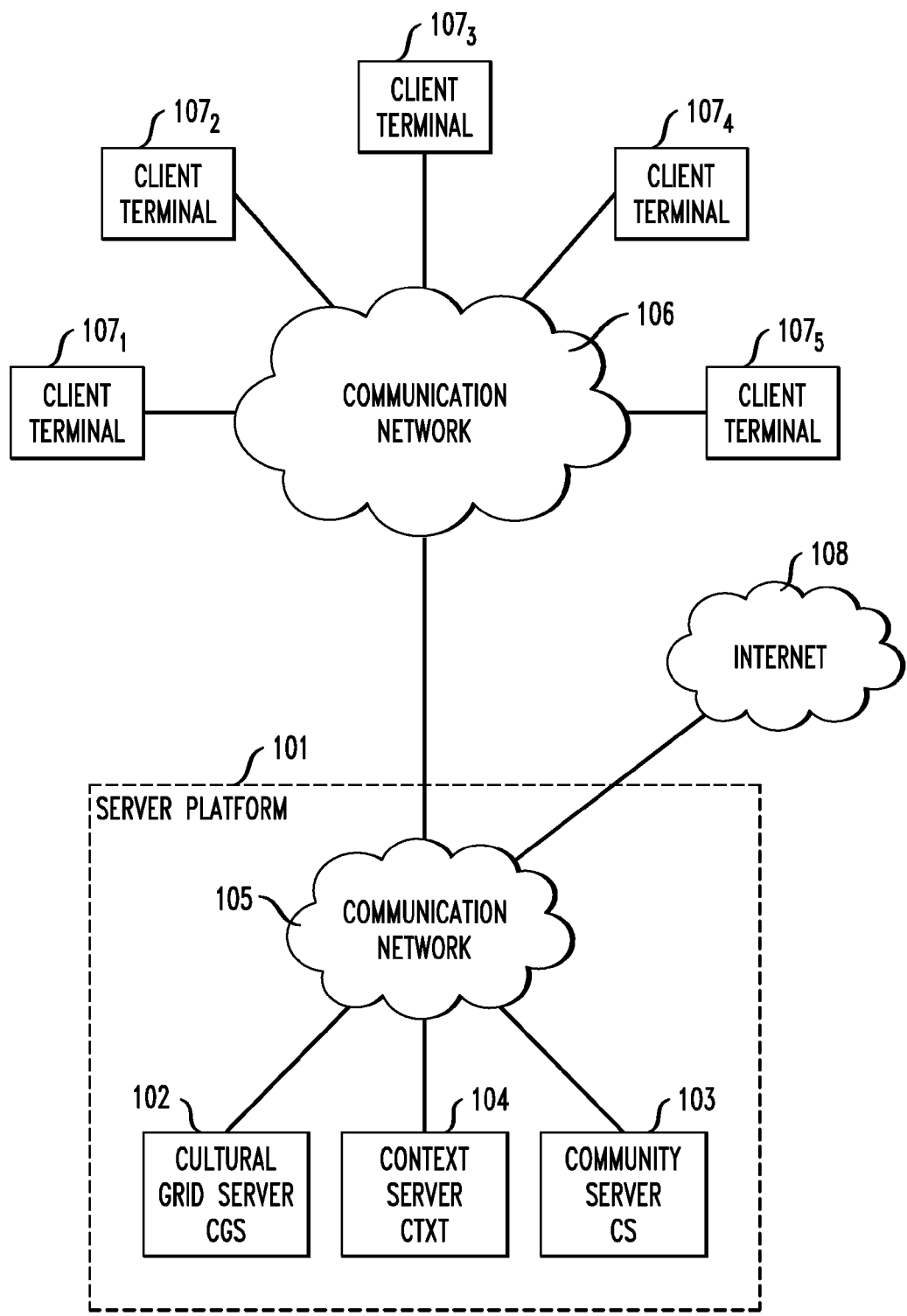
FIG. 1 illustrates one embodiment of the system according to the present invention.

FIG. 1 illustrates an embodiment of the system according to the present invention. It shows a server platform 101 wherein a first server is a community server 103, the second server is a cultural grid server 102, and the third server is a context server 104 are linked to a communication network 105. The communication network 105 is in turn linked to a communication network 106 which provides network access to client terminals $107_1$ to $107_5$. The communication network 105 also includes a link to the Internet 108 which can be accessed by any of the servers 102, 103 or 104 through the communication network 105.

In one particular embodiment, the client terminals $107_1$ to $107_5$ can be fixed terminals which are located at a point of interest. For instance, these terminals can be a column with a touch screen and a processing unit mounted on top. The processing unit can display information on the screen, receive input from the screen and communicate with the server platform 101 if the processing unit is connected to the communication network 106. In that particular example, the client terminals are fixed and the communication network 106 will generally be a wired network such as a copper wire network running the Ethernet or IEEE 802.2/802.3 protocol or an optical communication network. Alternatively, the client terminals $107_1$ to $107_5$ are mobile devices such as personal digital assistants (PDA), embedded devices, tablet pc's, mobile phones, etc. In other words, mobile devices which are able to give information in any form to a user, receive input from the user and communicate with a communication network 106. In case of mobile terminals, the communication network 106 will generally be a mobile communication network such as a WiFi (IEEE 802.11 a/big) network, a WiMax network (IEEE 802.16), a General Packet Radio Service (GPRS) network, a Global System for Mobile Communications (GSM) network etc. However, it may also be possible to provide access to communication network 106 for fixed terminals by using a wireless communication technology or to provide cables which are plugged into a mobile device at specific locations and thus use a wired network for mobile terminals.

The cultural grid server 102 is able to communicate with the various client terminals $107_1$ to $107_5$ over the communication networks 105 and 106. The communication includes receiving requests from client terminals $107_1$ to $107_5$, sending responses to client terminals $107_1$ to $107_5$ and sending information to client terminals $107_1$ to $107_5$. The cultural grid server 102 is further able to combine various responses to a single request into a single response, select responses based on information retrieved from the community server 103 or context server 104, retrieve additional information from external sources such as Internet 108, etc. The cultural grid server 102 may also contain a memory to store information related to the points of interest where client terminals $107_1$ to $107_5$ are located and additional information provided by users or retrieved from external sources such as the Internet 108.

The community server 103 is able to manage a user-group association and provides an interface to operators for configuring and altering such associations. For instance, the personnel at the entrance of an event or museum can access a graphical user interface at their desk which allows them to put each visitor in a particular group. The interface may also provide options to enter preferences for each visitor such as which route they prefer, if they want to visit or avoid crowded places, if they want to start at a particular point, etc. The community server 103 can also communicate to the other servers 102 and 104 in the server platform 101 using the communication network 105 and may even access the Internet 108. In an alternative embodiment, the community server may also be able to communicate with the client terminals $107_1$ to $107_5$, for instance if a client terminal offers an interface for users to define their preferences. The context server 104 is able to communicate to the other server 102 and 103 using communication network 105 and can retrieve information from the Internet 108 such as weather forecasts. Alternatively, the context server 104 uses other sources for weather information such as a local weather station or user reports. In addition, the context server 104 may also incorporate location information for a particular user which is provided by a mobile client terminal equipped with a GPS module or an equivalent module such as Galileo or Glonass. Both community server 103 and context server 104 may also include a memory to store any information that is relevant to other servers in the server platform 101 such as group information, user information, context information, etc.

It should be noted that the number of client terminals $107_1$ to $107_5$ is only an example, and that another embodiment may consist of more or less client terminals. The cultural grid server 102, community server 103 and context server 104 are illustrated as three separate nodes in server platform 101, however in an alternative embodiment these servers may each be made up out of multiple nodes or may be combined into a single or only two nodes. Communication network 105 and communication network 106 may also be combined into a single communication network providing communication channels for communication between server, between servers and terminals or even between terminals. In addition, the link to the Internet 108 may also provide a link to other networks such as corporate intranets.

Figure 2B:
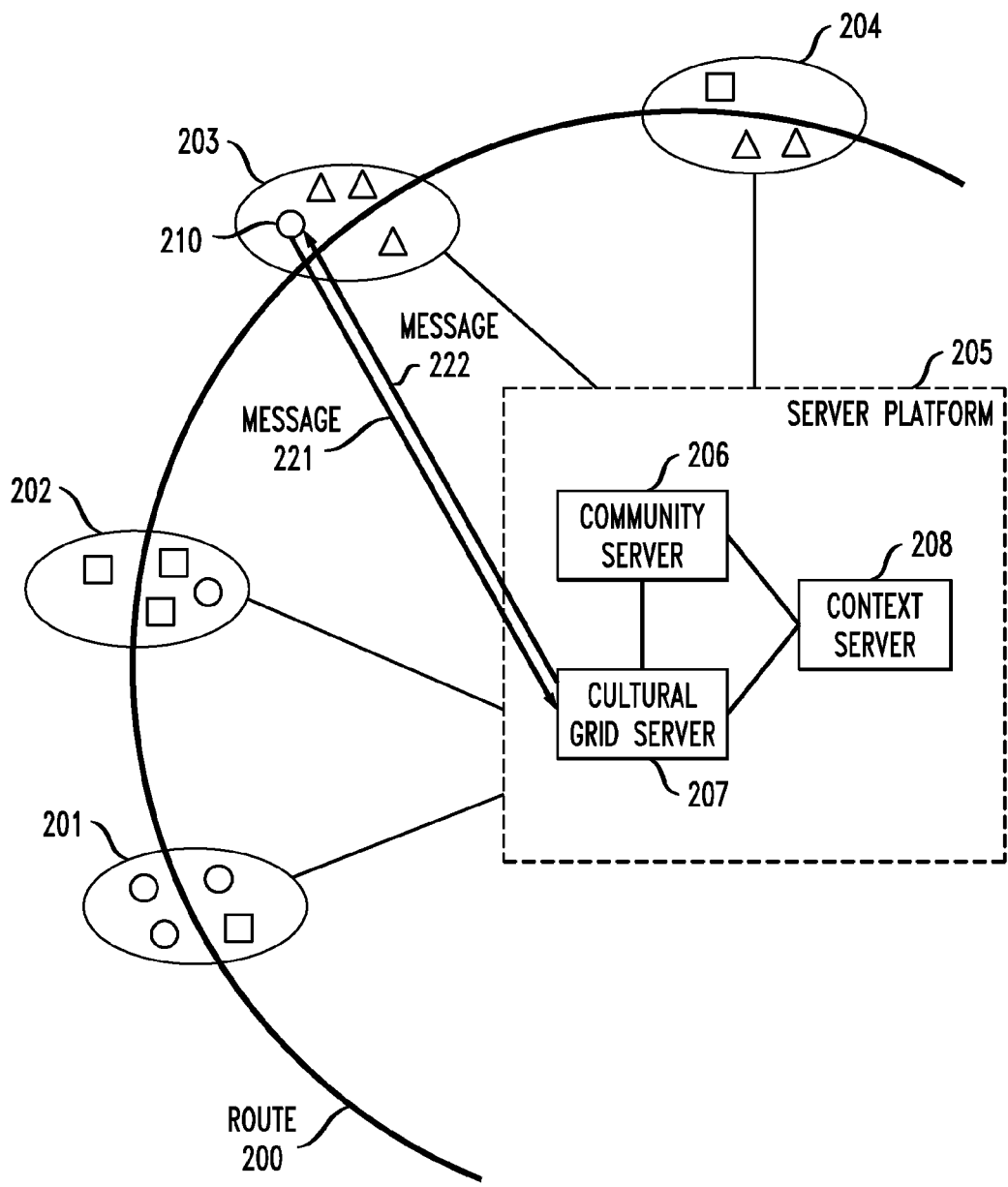
Figure 2C:
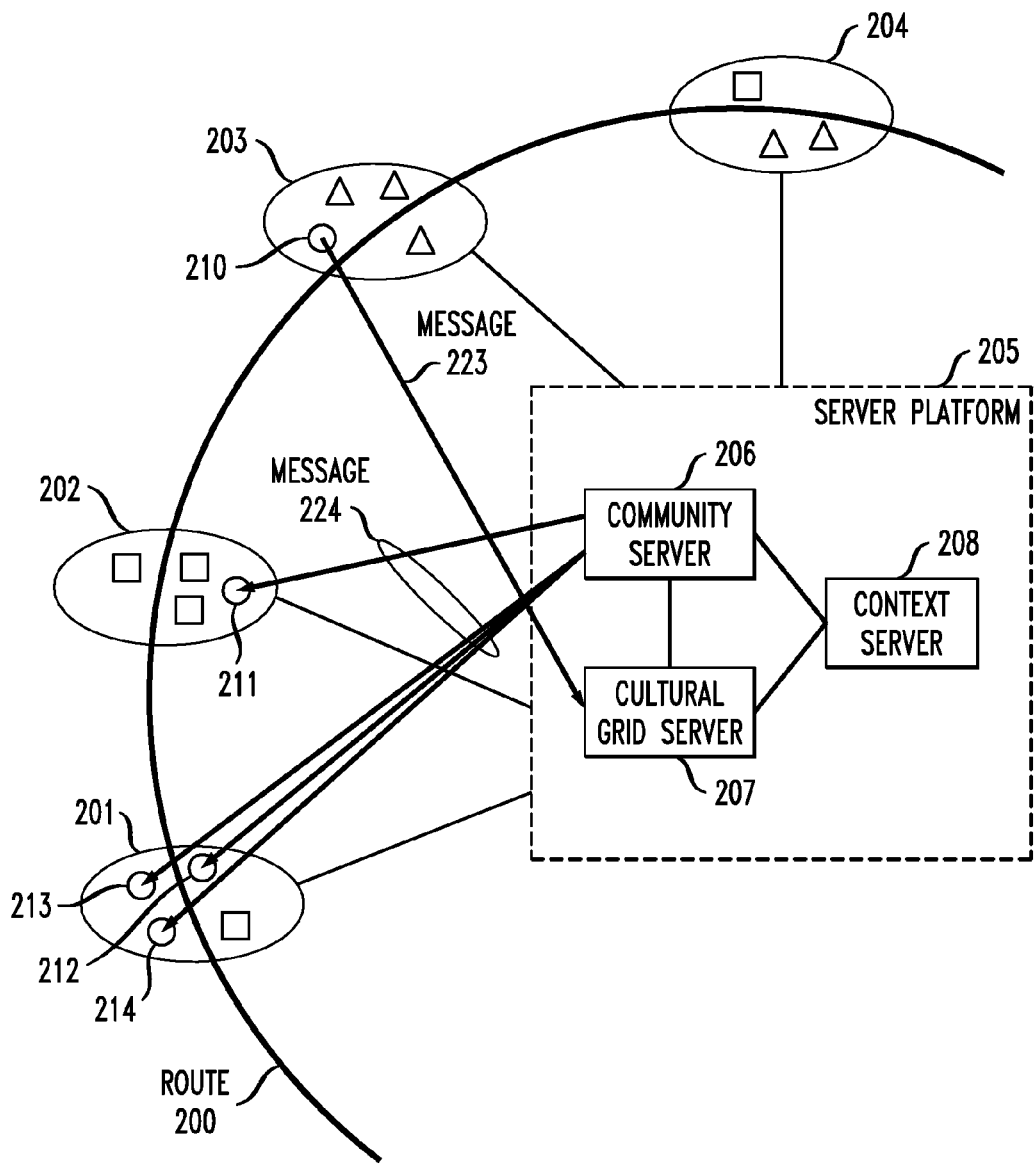

FIG. 1 was used to describe a general overview of an embodiment of the system according to the present invention. FIGS. 2a-2c will be used to describe one possible use case of an embodiment of the present invention.

FIG. 2a shows a general overview of a location with a route 200 linking four points of interest 201, 202, 203 and 204 which in this particular example correspond to four different animal cages in a zoo, respectively a lions cage 201, an elephant cage 202, a monkey cage 203 and a giraffe cage 204. At each of these cages there is a fixed client terminal (not shown) with a touch-screen and a pair of speakers to provide audiovisual information to a visitor and to allow the selection of choices and input of information or questions. The fixed client terminals at each of the points of interest are connected to the server platform 205. The server platform 205 consists of a first server which is a community server 206, a second server which is a cultural grid server 207 and a third server which is a context server 208. At the bottom of FIG. 2a, a group of users is shown, which consists of three separate, smaller groups indicated by a different shape, a square, a triangle and a circle. All users represented by the same shape belong to the same group of users. Each of these users received an identification tag upon entering the zoo before participating in the nomadic experience, i.e. their respective guided tour through the zoo along route 200.

In FIG. 2b, the groups of users have spread out along route 200 at the various points of interest. Four users have gathered at the lions cage 201, four users at the elephant cage 202, and so forth. Users of various groups have mixed at the various points of interest. User 210 is lagging behind the majority of his group. User 210 has arrived at the monkey cage 203 and touches the client terminal at the monkey cage 203 with his identification tag. This initiates a message 221 from the client terminal at the monkey cage 203 to the cultural grid server 207. Message 221 contains an identification of the client terminal, for instance a terminal identification number, and an identification of the user 210. The cultural grid server 207 can then retrieve information relating to the monkey cage 203 and transmit a message 222 to the client terminal at the monkey cage 203. The message 222 contains text based information relating to the monkeys and a video-fragment about monkeys. In addition, the message 222 can provide information about points of interest which user 210 has not yet visited.

After reading the information and viewing the video fragment, user 210 has to decide where to go next which is illustrated in FIG. 2c. However, user 210 is the only person of his group at the monkey cage 203 and wants to meet with the remainder of his group. Therefore, user 210 wants to find the point of interest where most of his group is. User 210 then touches the client terminal at the monkey cage 203 with his identification tag again and selects the option to locate his group members. This triggers a message 223 from the client terminal at the monkey cage 203 to the cultural grid server 207. Cultural grid server 207 can request the community server 206 for a list of users in the same group as user 210 and use the list to contact these users with a message 224. The message 224 contains a request for advice, where user 210 should go next to meet up with the group. Message 224 is sent to user 211 who is currently at the client terminal at the elephant cage 202 and users 212, 213 and 214 who are at the client terminal at the lions cage 201.

Figure 2D:
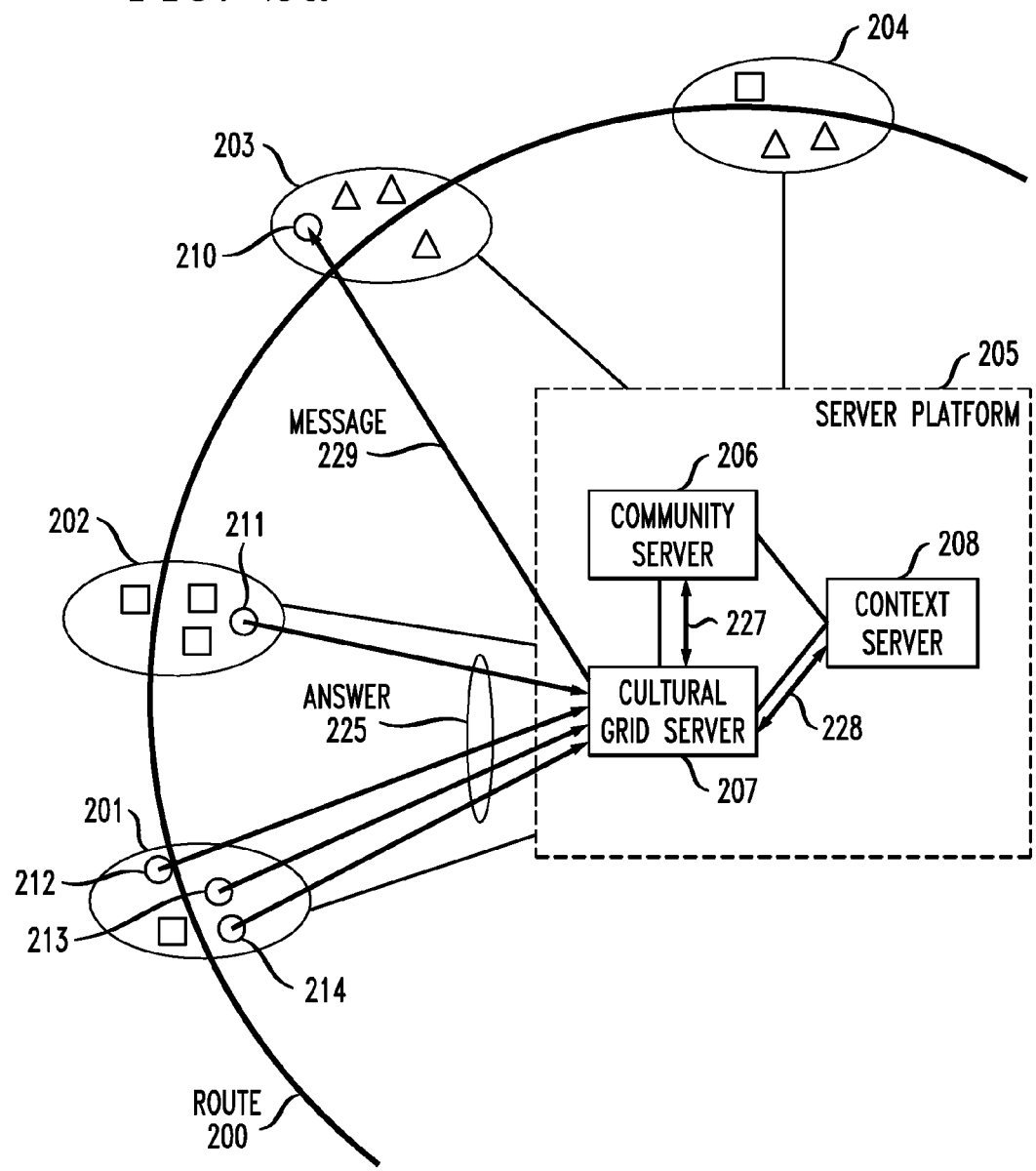

FIG. 2d illustrates how user 210 receives a response from the other users 211, 212, 213 and 214 who are in the same group. Each of the users sends an answer 225 which indicates their current location as the next place to go for user 210. The cultural grid server 207 receives these suggestions and combines them to form a final decision. However, the cultural grid server 207 first verifies that all the users 211-214 belong to the same group as user 210. This is achieved by sending a message 227 from the cultural grid server 207 to the community server 206, which will verify that the users indeed all belong to the same group and answer to the cultural grid server 207. The cultural grid server will simultaneously request the context for each of the users from context server 208 in a message 228. Important factors are for instance if user 210 has already visited the location of the other users or not. Assuming that each user is at its first location in this particular example, all cages are an option for user 210. The cultural grid server may then consolidate all the responses from users 211-214 to give a final suggestion to user 210 in a message 229. In this particular embodiment, the cultural grid server 207 will suggest user 210 to visit the lions cage 201 because most members of the group are at that location.

It should be noted that the number of users at a point of interest and the combination of groups at the points of interest are only illustrative and should not be considered as limiting to how many users that can be present at a particular point or how users of various groups can be combined. In addition, the combination of users or mixing of users from various groups only means that they are at or near the same point of interest at that given time, there is not necessarily any interaction between the users of various groups at the given point of interest. However, in a more advanced embodiment it may be possible to have interaction between various groups which are currently active or to provide information from groups in the past to groups which are currently active.

It is important to realize that the selection of the next location can be based on the number of people at a particular location, but may also be selected by the first group member to respond, at random, by voting, etc. The cultural grid server may also ignore the context of a user or use more context parameters than only the places which have been or have not yet been visited by a particular user.

Although the present invention has been illustrated by reference to specific embodiments, it will be apparent to those skilled in the art that the invention is not limited to the details of the foregoing illustrative embodiments, and that the present invention may be embodied with various changes and modifications without departing from the spirit and scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the spirit and scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a server system, terminal or another integrated unit may fulfil the functions of several means recited in the claims. Any reference signs in the claims shall not be construed as limiting the respective claims concerned. The terms "first", "second", and the like, when used in the description or in the claims are introduced to distinguish between similar elements or steps and are not necessarily describing a sequential or chronological order.

The invention claimed is:

1. A system for supporting groups of users during a nomadic experience, the system comprising:
   a first hardware-based server that is operative to maintain association information of each user with at least one respective group, to maintain information regarding a makeup of each group, and to provide aspects of the maintained information when requested or triggered to do so;
   a second server that is operative to receive information regarding a current makeup of at least a particular group from the first server, to receive a trigger from a trigger source, to locate information called for by the trigger and provide the located information to at least a first member of the particular group based upon the trigger, to provide group specific information to at least a second member of the particular group based at least upon the current makeup information and to provide information related to a point of interest to at least a third member of the particular group, wherein the first, second and third members may be the same or different members, wherein the second server is operative to receive a trigger from a first member of the particular group requesting information regarding a next place to visit, to locate information called for by the trigger including location information regarding other members of the particular group and provide at least one of the located information to at least the first member of the particular group and a recommendation based on the located information;
   an output for transmitting information to an associated client terminal for at least the second server during the nomadic experience; and an input for receiving information from the associated client terminal for delivery to at least the second server during the nomadic experience.

2. The system of claim 1 comprising:
a third server operative to select and/or filter information communicated to at least one member of at least one group based on a context of the at least one member and to send a trigger to the second server regarding transmission of the selected or filtered information.

3. The system of claim 2 wherein the third server is operative to select and/or filter the information based on the context of the at least one member of at the least one group, wherein the context of the at least one member includes information provided by a source external to the system.

4. The system of claim 2 wherein the third server is operative to send a trigger to the second server and wherein the second server is operative to communicate an alternate point of interest to at least one selected member of at least one selected group based on context information associated with the trigger.

5. The system of claim 2 wherein the third server is operative to notify the first server if one of the at least one member leaves the nomadic experience and the first server is operative to update the information regarding the makeup of at least the particular group of the one of the at least one member.

6. The system of claim 2 wherein the third server is operative to monitor the context of the at least one member.

7. The system of claim 1 wherein the first server is operative to send a trigger to the second server, the trigger indicating a change in the makeup of the particular group and the second server is operative to update a list of users to communicate with when communicating with members of the particular group based on the trigger.

8. A community server, the community server comprising:
a hardware-based server that is operative to maintain association information of each user of a plurality of users of a nomadic experience support system with at least one respective group, to maintain information regarding a makeup of each group of a plurality of groups of users of the nomadic experience support system, and to provide aspects of the maintained information when requested or triggered to do so, and to send a trigger to an associated cultural grid server, the cultural grid server being operative to receive information regarding a current makeup of at least one particular group of users of a nomadic experience support system from a group information source, to receive a trigger from a trigger source, to locate information called for by the trigger and provide the located information to at least a first member of a group of the at least one particular group of users of the nomadic experience support system based upon the trigger, to provide group specific information to at least a second member of the group based at least upon current makeup information of the group and to provide information related to a point of interest to at least a third member of the group based at least on preference information of the group, wherein the first, second and third members may be the same or different members of the group, wherein the cultural grid server is operative to receive the information regarding the current makeup of at least a particular group from the hardware-based server, to receive a trigger from a first member of the particular group requesting information regarding a next place to visit, to locate information called for by the trigger including location information regarding other members of the particular group and provide at least one of the located information to at least the first member of the particular group and a recommendation based on the located information.

9. The community server of claim 8, wherein the server is operative to determine and to maintain information regarding preferences of at least one member of at least one group of the plurality of groups.

10. The community server of claim 8, wherein the server is operative to maintain preference information regarding at least one of: favorite subjects, preferred context and current availability of at least one user of the plurality of users.

11. The community server of claim 8, wherein the server is operative to provide an interface for an operator to provide the association information of the users with the at least one respective group and provide the preference information of the users.

12. A cultural grid server, the culture grid comprising:
a hardware-based server that is operative to receive information regarding a current makeup of at least one particular group of users of a nomadic experience support system from a group information source, to receive a trigger from a trigger source, to locate information called for by the trigger and provide the located information to at least a first member of a group of the at least one particular group of users of the nomadic experience support system based upon the trigger, to provide group specific information to at least a second member of the group based at least upon current makeup information of the group and to provide information related to a point of interest to at least a third member of the group based at least on preference information of the group, wherein the first, second and third members may be the same or different members of the group, wherein the hardware based server is operative to receive the information regarding a current makeup of at least a particular group from an associated first server that is operative to maintain association information of each user with at least one respective group, to maintain information regarding a makeup of each group, and to provide aspects of the maintained information when requested or triggered to do so, and wherein the hardware-based server is operative to receive a trigger from a first member of the particular group requesting information regarding a next place to visit, to locate information called for by the trigger including location information regarding other members of the particular group and provide at least one of the located information to at least the first member of the particular group and a recommendation based on the located information.

13. The cultural grid server of claim 12 wherein the server is operative to locate the information called for by the trigger by at least one of: accessing a local storage of the server, communicating with a context server to determine context information of at least one of at least one member of the group and the group, collecting the information from one or more sources over the Internet and requesting the information from other members of the group.

14. The cultural grid server of claim 12 wherein a community server is operative to determine and to maintain information regarding preferences of at least one member of the group and wherein the cultural grid server is operative to receive preference information of at least the third member maintained by the community server when providing information in relation to a point of interest to at least the third member of the group.

15. The cultural grid server of claim 12 wherein the server is operative to maintain route information regarding members of the group and to provide directions to a next point of interest to at least one member of the particular group.

16. A context server, the context server comprising:
a hardware-based server that is operative to select and/or filter information communicated to at least one member of a particular group of users of an associated nomadic experience support system, the selection and/or filtering being based on a context of the at least one member and to send a trigger to a second server regarding transmission of the selected or filtered information, wherein the nomadic experience support system includes the context server, an associated community server and an associated cultural grid server, the associated cultural grid server being operative to receive information regarding a current makeup of the particular group of users of the nomadic experience support system from a group information source, to receive a trigger from a trigger source, to locate information called for by the trigger and provide the located information to at least a first member of the particular group of users of the nomadic experience support system based upon the trigger, to provide group specific information to at least a second member of the group based at least upon current makeup information of the group and to provide information related to a point of interest to at least a third member of the group based at least on preference information of the group, wherein the first, second and third members may be the same or different members of the group, and the associated community server being operative to maintain association information of each user of a plurality of users of the nomadic experience support system with at least one respective group, to maintain information regarding a makeup of each group of a plurality of groups of users of the nomadic experience support system, and to provide the maintained information when requested or triggered to do so.

17. The context server of claim 16 wherein the context server is operative to select and/or filter the information based on the context of the at least one member, wherein the context of the at least one member includes information provided by a source external to the context server, community server and cultural grid server.

18. The context server of claim 16 wherein the context server is operative to send a trigger to the second server and wherein the trigger is associated with context information.

19. The context server of claim 16 wherein the context server is operative to notify another element of the nomadic experience support system server if the at least one member leaves the nomadic experience.

20. A client terminal, the client terminal comprising:
a user interface;
an input for receiving information during a nomadic experience from an associated system for supporting particular identified groups of users during nomadic experiences;
an output for transmitting information during the nomadic experience to the system for supporting particular identified groups of users during nomadic experiences;
a processing unit operative to provide information to a user via the user interface, to receive information from the user via the user interface, to transmit information during the nomadic experience to the system for supporting groups of users during nomadic experiences via the output and to receive information during the nomadic experience from the system for supporting particular identified groups of users during nomadic experiences via the input, wherein the associated system for supporting particular identified groups of users during nomadic experiences comprises a first server that is operative to maintain association information of each user with at least one respective group, to maintain information regarding a makeup of each group, and to provide aspects of the maintained information when requested or triggered to do so; and
a second server that is operative to receive information regarding a current makeup of at least a particular group from the first server, to receive a trigger from a trigger source, to locate information called for by the trigger and provide the located information to at least a first member of the particular group based upon the trigger, to provide group specific information to at least a second member of the particular group based at least upon the current makeup information and to provide information related to a point of interest to at least a third member of the particular group, wherein the first, second and third members may be the same or different members.

21. The client terminal of claim 20 wherein the user interface comprises an identification tag reader.

22. The client terminal of claim 20 wherein the processing unit is operative to receive information regarding a recommended next point of interest from the system for supporting particular identified groups of users during nomadic experiences via the input during the nomadic experience and provide a recommend next point of interest to the user via the user interface.

23. The client terminal of claim 20 wherein the processing unit is operative to transmit, during the nomadic experience, both an identification of the client terminal and an identification of a user using the client terminal to the system for supporting particular identified groups of users during nomadic experiences via the output during the nomadic experience.

24. The client terminal of claim 20 wherein the processing unit is operative to transmit, during the nomadic experience, both location information regarding the client terminal and at least one of an identification of the client terminal and an identification of a user using the client terminal to the system for supporting particular identified groups of users during nomadic experiences via the output during the nomadic experience.

25. The client terminal of claim 20 wherein the processing unit is operative to receive at least one of: information regarding a point of interest and a request for advice regarding a next point of interest for another user from the system for supporting particular identified groups of users during nomadic experiences via the input during the nomadic experience.

26. The client terminal of claim 20 wherein the processing unit is operative to transmit, during the nomadic experience, at least one of: a request for location information regarding other members of a particular group of the user and location information regarding the location of the user to the system for supporting particular identified groups of users during nomadic experiences via the output during the nomadic experience.

27. A system for supporting groups of users during a nomadic experience, the system comprising:
a first hardware-based server that is operative to maintain association information of each user with at least one respective group, to maintain information regarding a makeup of each group, and to provide aspects of the maintained information when requested or triggered to do so;
a second server that is operative to receive information regarding a current makeup of at least a particular group from the first server, to receive a trigger from a trigger source, to locate information called for by the trigger and provide the located information to at least a first member of the particular group based upon the trigger, to provide group specific information to at least a second member of the particular group based at least upon the current makeup information and to provide information related to a point of interest to at least a third member of the particular group, wherein the first, second and third members may be the same or different members;

a third server operative to select and/or filter information communicated to at least one member of at least one group based on a context of the at least one member and to send a trigger to the second server regarding transmission of the selected or filtered information;

an output for transmitting information to an associated client terminal for at least the second server during the nomadic experience; and an input for receiving information from the associated client terminal for delivery to at least the second server during the nomadic experience.

28. The system of claim 27 wherein the third server is operative to send a trigger to the second server and wherein the second server is operative to communicate an alternate point of interest to at least one selected member of at least one selected group based on context information associated with the trigger.

29. The system of claim 27 wherein the first server is operative to send a trigger to the second server, the trigger indicating a change in the makeup of the particular group and the second server is operative to update a list of users to communicate with when communicating with members of the particular group based on the trigger.

* * * * *